| | | | |
|---|---|---|---|
| | | United States Patent [19] | [11] 4,215,176 |
| | | Tuller et al. | [45] Jul. 29, 1980 |

[54] POLYAMIDE LAMINATES

[75] Inventors: Harold W. Tuller, Long Valley; Stephen R. Schulze, Gillette, both of N.J.

[73] Assignee: Allied Chemical Corporation, Morris Township, Morris County, N.J.

[21] Appl. No.: 939,592

[22] Filed: Sep. 5, 1978

[51] Int. Cl.$^2$ ............................................. B32B 27/36
[52] U.S. Cl. .............................. 428/412; 428/475 X; 428/476 X; 428/477; 428/478
[58] Field of Search ............... 428/475.2, 475.8, 476.1, 428/476.9, 476.3, 412; 280/857 UN, 857 L

[56] References Cited

U.S. PATENT DOCUMENTS

| | | | |
|---|---|---|---|
| 3,492,367 | 1/1970 | Starkweather, Jr. et al. | 260/857 |
| 3,676,400 | 7/1972 | Kehan et al. | 260/857 L |
| 3,686,069 | 8/1972 | Winkler | 428/475.2 |
| 3,697,368 | 10/1972 | Bhuta et al. | 428/475.8 |
| 3,746,609 | 7/1973 | Stange et al. | 260/78.5 BB |
| 3,791,915 | 2/1974 | Goehring et al. | 428/476.3 |
| 3,908,070 | 9/1975 | Marzolf | 428/474 |
| 3,963,799 | 6/1976 | Starkweather, Jr. et al. | 260/857 L |
| 3,997,383 | 12/1976 | Bieler et al. | 428/475.5 |
| 3,998,990 | 12/1976 | Iwami et al. | 428/476.3 |
| 4,078,014 | 3/1978 | Starkweather, Jr. et al. | 260/857 L |

*Primary Examiner*—George F. Lesmes
*Assistant Examiner*—E. Rollins Buffalow
*Attorney, Agent, or Firm*—Patrick L. Henry; Henry E. Naylor

[57] ABSTRACT

Improved multi-layered laminates having at least one layer of a polyamide such as polyepsiloncaprolactam containing an excess of terminal amine groups and at least one layer, opposing the polyamide layer, containing a polymer having pendent carboxylic acid groups, their salts, carbonates, or acid anhydrides.

35 Claims, No Drawings

POLYAMIDE LAMINATES

BACKGROUND OF THE INVENTION

1. Field of the Invention

This invention relates to multi-layered laminated structures comprised of at least one layer of a polyamide containing an excess of terminal amine end groups, said layer being contiguous to another layer containing at least one polymer having pendent carboxylic acid groups, carboxylate salts, carboxylic acid anhydrides, carbonates or mixtures thereof.

2. Description of the Prior Art

Laminates of polyamides with acid or anhydride-containing alkylenic polymers are known in the art. These laminate structures, either in the form of films or sheets, can be fabricated into products such as food packaging, bottles, gasoline tanks, and the like. Such laminates offer both the advantages of polyamides such as strength, abrasion resistance, low friction, heat resistance, and low gas permeability as well as the cost advantage and low water permeability of alkylene polymers.

Although these polyamide/alkylenic-polymer laminates offer the aforementioned advantages, insufficient adhesion between the polyamide layer and the alkylenic-polymer layer reduces their strength and usefulness. This adhesion can be particularly low under certain conditions such as high moisture levels or cold temperatures.

SUMMARY OF THE INVENTION

In accordance with the present invention, there is provided a multi-layered laminated structure comprised of at least one layer of a polyamide bonded to at least one opposing polymeric layer, wherein the polyamide contains at least 1.5 times as many amine end groups than acid end groups, and the opposing polymeric layer contains an effective amount of functional groups selected from the group consisting of acid groups, metal salts of said acids wherein the metal is selected from Groups I, II, III, VI-A and VII of the Periodic Table of the Elements, acid anhydrides, carbonates or mixtures thereof.

In a more preferred embodiment in accordance with the present invention there is provided a multi-layered laminated structure comprised of at least one layer of polyepsilon-caprolactam containing about 60 to 97 mol percent of its end groups as amine end groups and at least one opposing layer of an interpolymer comprised of units derived from ethylene and a comonomer selected from the group consisting of acrylic acid, methacrylic acid, and maleic anhydride.

Preferably the opposing polymeric layer is comprised of an alkylenic interpolymer formed by the polymerization of olefinic monomers containing such groups, the copolymerization of said olefinic monomers with other monomers, or the grafting of polymers or monomers, containing such groups, with alkylenic polymers. The salts of carboxylic acids suitable for use herein are preferably formed subsequent to the polymerization or copolymerization of the acid-containing monomers.

Laminates of the present invention are characterized by superior adhesion of the polyamide layer to the alkylenic interpolymer layer such that the layers will not separate under adverse conditions such as relatively high moisture levels and/or relatively cold temperatures.

DETAILED DESCRIPTION

Polyamides suitable for use herein include the long chain polymeric amides having recurring amide groups as part of the polymer backbone and preferably having a number average molecular weight, as measured by membrane osmometry of about 15,000 to 40,000 and containing at least 1.5 times as many amine groups as acid groups.

Particularly preferred are polyamides prepared by the polymerization of epsilon-caprolactam in the presence of a comonomer containing two or more amine groups per molecule such as hexamethylene diamine.

Other lesser preferred examples of such polyamides are: (a) those prepared by the condensation of a diamine with a dibasic acid in the presence of an excess amount of diamine or a multifunctional amine compound containing at least three amino groups per molecule, with the diamine preferably being hexamethylene diamine and the dibasic acid being adipic acid or sebasic acid; (b) random interpolymers of the above monomer groups having an excess amount of diamine or other multifunctional amine compound; and (c) blends or block interpolymers comprising 2 or more of these polyamides, at least one of which is prepared with a surplus of polyfunctional amine as herein described. Preferred are those polyamides based on the polymerization of epsilon-caprolactam and those based on a diamine and a diacid, more preferred are those based on epsilon-caprolactam.

The polyamide can be produced by any conventional process known in art. Illustrative of one such process which is suitable for producing polyepsilocaprolactam involves two steps. The first step consists of heating epsilon-caprolactam and a hexamethylene diamine and water to a temperature of from about 180° to 300° C. under superatmospheric pressure (about 200 to 280 lbs/in$^2$) to effect partial polymerization. The water is allowed to distill gradually from the reaction mixture while the polymerization continues after most of the monomer has been converted to a low molecule weight polymer. The pressure is reduced to atmospheric pressure wherein the second step is commenced which comprises completing the polymerization by heating at atmospheric pressure in the range of about 180° to 300° C.

Other lesser preferred examples of diamines suitable for use herein include tetramethylene diamine, pentamethylene diamine, octamethylene diamine and decamethylene diamine. The amount of diamine needed to produce the high diaminecontaining polyamides of the present invention varies depending on the amount of amine desired and the molecule weight of the resulting polymer and can be easily determined by one skilled in the art. For example, about 0.25 mol percent of hexamethylene diamine is required to produce a polyepsiloncaprolactam of about 21,000 number average molecular weight having about 80 equivalents/$10^6$ gm amine end groups and about 17 equivalents/$10^6$ acid end groups. Generally the amount of amine end groups required in the polyamide, in order to give improved adhesion to the alkylenic interpolymers, is at least 1.5 times the amount of acid end groups, preferably at least 2 times, more preferably at least 3 times, and most preferably at least 4 times.

It is preferred that the polyamide used herein have a maximum amount of amine functionality. The maximum amount of amine functionality is dependent on the number average molecular weight of the polyamide and can be easily calculated by use of the following formula:

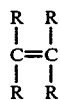

$$R = \dfrac{\dfrac{10^6}{m} + \sqrt{\dfrac{10^{12}}{m^2} - 450}}{\dfrac{10^6}{m} - \sqrt{\dfrac{10^{12}}{m^2} - 450}}$$

where R is the maximum practical ratio of amine to acid functionality and m is the number average molecular weight. For example, for a polyepsiloncaprolactam having a number average molecular weight of 40,000, the maximum ratio of amine to acid functionality in the polyamide would be about 3.2 to 1 and for a number average molecular weight of 17,000 the maximum ratio of amine to acid would be about 29 to 1.

Alkylenic interpolymers suitable for use in the opposing layers in the present invention are those polymers which may contain, as a major comonomer, substituted as well as unsubstituted ethylenically unsaturated compounds represented by the formula,

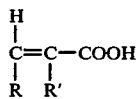

$$\begin{array}{c} R \quad R \\ | \quad | \\ C=C \\ | \quad | \\ R \quad R \end{array}$$

wherein each R can be independently hydrogen, or a substituted or unsubstituted alkyl or aryl radical of up to 8 carbon atoms. Non-limiting examples of such monomers include heptene-1, decene-1, styrene ethylene, propylene, butene, cyclopentene and cyclohexene. Halogenated materials such as tetrafluoroethylene, conjugated dienes, such as butadiene-1,3; 2-chlorobutadiene-1,3 (chloroprene); and 2,3-dimethylbutadiene-1,3, etc., can also be satisfactorily employed.

Other comonomers present in minor amounts which are suitable for use in the present invention are $C_3$ to $C_9$ carboxylic acid-containing comonomers. Illustrative of such carboxylic acid-containing comonomers include the monocarboxylic acids represented by the formula $$\begin{array}{c} H \\ | \\ C=C-COOH \\ | \quad | \\ R \quad R' \end{array}$$

where R' can be hydrogen or a $C_1$ to $C_6$ alkyl group, and R can be hydrogen or fluorine. Non-limiting examples of such carboxylic acids include acrylic acid, methacrylic acid, 2-ethylacrylic acid, crotonic acid, and 2-butylacrylic acid; preferred is acrylic acid and methacrylic acid.

Also suitable for use are carboxylic acid-containing olefins such as 3-butenoic acid, 3-hexenoic acid, maleic acid and the like.

Also suitable for use as the copolymer in minor amounts are anhydride-containing monomers, preferably maleic anhydride. Preferred interpolymers containing anhydrides are styrene-maleic anhydride copolymers and ethylene-maleic anhydride copolymers containing up to about 50 mol percent of units derived from maleic anhydride.

Also suitable for use in the present invention, as the minor comonomer, are metal salts of the aforementioned carboxylic acids wherein the metal is one or more mono-, di-, or trivalent metal of Groups I, II, III, IV-A and VII of the Periodic Table of Elements. Polymers wherein the matals are of Group I and II and especially $Na^+$, $K^+$, and $Zn^{++}$ are preferred; most preferred is $Zn^{++}$. It will be appreciated by those skilled in the art that where the composite is to be utilized in the packaging of foods, the metal selected should be non-toxic. The carboxylate salt of the acids are preferably formed by the reaction of the finished polymer with metal bases. These compositions are more fully set forth in U.S. Pat. No. 3,264,272 incorporated herein by reference.

The alkylenic acid interpolymers may be prepared by methods well known in the art including those disclosed in U.S. Pat. Nos. 3,355,319 and 3,264,272, wherein the interpolymers are obtained by the copolymerization of a mixture of the olefin and the carboxylic acid monomer. It is preferred that the acid-containing polymers employed herein have a high polarity as indicated by wetting measurements, i.e., they should be capable of being wetted by inert solvents having surface tensions of 37 dynes per centimeter or greater.

The preferred acid-containing interpolymers herein are ethylene-acrylic acid or ethylene-methacrylic acid copolymers containing at least 50 mol percent ethylene wherein a portion of the acid groups may have been converted to salts of $Na^+$, $K^+$, or $Zn^{++}$.

The acid and acid anhydride-containing interpolymers herein may also be prepared by the grafting reaction of polymerizable cyclic ethylenically unsaturated carboxylic acids or acid anhydrides with alkylenic homopolymers or interpolymers. Nonlimiting examples of such alkylenic polymers which may be reacted with such acids and acid anhydrides include polyethylene, copolymers of ethylene and butadienes, polypropylene, and copolymers of ethylene and vinyl acetate. Nonlimiting examples of such acids and acid anhydrides include maleic anhydride, 4-methylcyclohex-4-ene-1,2-dicarboxylic acid anhydrides; tetrahydrophthalic anhydride; methylnorborn-5-ene-2,3-dicarboxylic anhydride; norborn-5-ene-2,3-dicarboxylic anhydride; 2-cyclopentenylacetic acid, abietic acid; maleo-primaric acid, and bicyclo[2,2,2,]oct-5-ene-2,3-dicarboxylic anhydride.

These graft polymers can be prepared according to any of the conventional methods known in the art, some of which are disclosed in U.S. Pat. Nos. 3,873,643 and 3,882,194.

The opposing layers of the subject composites may also include blends of 2 or more polymers, at least one of which contains the acid, acid salt, acid anhydride, or carbonate functionality as herein described.

The concentration of acid, acid salt, and/or anhydride functionality of the alkylenic interpolymer need only be present in an effective amount. By an effective amount we mean that amount which will give improved adhesion to a conventional polyamide, such as polycaprolactam having amine terminal functionality on one end of the molecule and acid functionality on the other end. Of course, in accordance with the present invention, when a polyamide containing an excess of amine terminal functionality is used in place of the conventional polyamide, the adhesion is substantially further improved.

Generally, the mol % of acid functionality can be as low as about 0.1 mol % or as high as 50 mol %, preferably about 0.5 to 25 mol % more preferrably about 1 to 10 mol %. Also, the mol % of anhydride functionality can be about 0.05 mol % to 50 mol %, preferably about 0.2 mol % to 25 mol %.

The polyamide layers can contain or be blended with up to about 25 wt.% other polymeric material, preferably up to 10 wt.%, and more preferably up to 5 wt.%. When the other polymeric material is that of the opposing layer, up to 50 wt.% of such material can be blended into the polyamide layer.

It will be noted that the other polymeric materials which can be blended into the composites of the present invention can be recycled scrap resulting from the production of the composites herein or from other composite structures as long as the aforementioned requirements as to functional groups are met. When the scrap used is obtained solely from the manufacture of the composites of the present invention, it can be recycled in such a way that it is used as part of or in place of one or more of the layers of the composite such that a polyamide layer blended with said scrap can contain up to 50 wt.% non-polyamide material and the opposing layer can contain up to 50 wt.% polyamide.

It will also be noted that condensation polymers can also be used for the opposing layers in the composites of the present invention. Preferred condensation polymers include polyesters and polycarbonates, more preferably polyethyleneterephthalate, polybutyleneterephthalate, and the polycarbonates of bisphenol A. These condensation polymers also preferably contain pendant functionality selected from the group consisting of carboxylic acids, metal salts of said acids wherein the metal is selected from Groups I, II, III, IV-A and VII of the Periodic Table of the Elements, acid anhydrides or mixtures thereof.

It should be noted that polyesters and polycarbonate resin need not contain the above pendent functional groups before processing owing to the fact during melt blending, such polymers undergo hydrolytic degradation leading to the formation of functional groups such as carboxylic acid or carbonate.

The laminated structures of the present invention can be prepared by any conventional method generally known in the art. Non-limiting examples of such methods include blown film coextrusion, cast film coextrusion, coating extrusion, coextrusion blow molding, thermal lamination, multi-component injection molding, and layered rotational molding.

In film or sheet extrusion, the polyamide layer and interpolymer layer are each extruded from separate extruders and subsequently laminated together at elevated temperatures by passage through a common die, or adjacent dies. Extrusion coating, for purposes of the present invention, is the extrusion of a film or sheet of the alkylenic interpolymer onto a prefabricated film or sheet of polyamide or vice versa. Rotational molding as used herein includes the procedure wherein both the polyamide and the alkylenic interpolymer are rotably blended in a rotational mold. Each is then melted by heating the mixture to a temperature above the melting point of the highest melting material in the mixture but below the degradation temperature of either of the materials. The mixture is then rotated for a time sufficient to achieve good distribution of material on the inner wall of the mold. The mold is then cooled while rotating to solidify the materials. The polyamide will be disposed innermost of the molded article. Also included in rotation molding is sequential casting the polyamide and the alkylenic interpolymer cast onto the inside of a hot rotating mold.

The examples which follow illustrate the invention and set forth the best mode which we have contemplated for carrying out the invention, but are intended as illustrative only and not as limiting.

EXAMPLES 1–5

Various single layer films of polyepsiloncaprolactam and alkylenic interpolymers as set forth in Table I below were prepared. The thickness of the layers was between 4 and 5 mils and they were prepared by using a 1 inch extruder equipped with a 6 inch wide film die and a double roll casting take-up. The extruder and die temperatures were controlled to 500° F. and the casting rolls at about 135° F.

The polyepsiloncaprolactam and alkylenic films were produced separately. The polyepsiloncaprolactam film was vacuum dried at 83° C. for about 2½ hours and both films were cut into strips 1½ inches wide and 5 inches wide. A layer of polyepsiloncaprolactam film and a layer of polyolefin film were sandwiched between 1 mil thick aluminum film and heat sealed for 3.8 seconds at a pressure of 25 psi using a standard bag sealer equipped with 1 inch platens controlled at a temperature of 470° F.

The aluminum film was removed from only the polyepsiloncaprolactam side and the laminates were immersed in water for 12 hours after which they were tested for peel strength at 5 inches/minute in an Instron testing machine. The resulting peel strengths are shown in Table I below and represent the force required to separate the polyepsiloncaprolactam layer from the polyolefin layer.

TABLE I

| Example | Layer A Amine/Acid[2] | Layer B | Peel Strength lbs/1" wide strip |
|---|---|---|---|
| C[1]-A | 1.00 | Surlyn 1650 SB[3] | 0.075 |
| 1 | 1.62 | Surlyn 1650 SB | 0.24 |
| 2 | 2.03 | Surlyn 1650 SB | 0.42 |
| 3 | 2.58 | Surlyn 1650 SB | 1.00 |
| 4 | 4.70 | Surlyn 1650 SB | 4.4 |
| C-B | 1.00 | Plexar I[4] | 4.3 |
| 5 | 4.70 | Plexar I | I.S.[5] |

[1] = comparative example
[2] = layer comprised of polyepsiloncaprolactam containing the ratio of amine end groups to acid end groups as indicated.
[3] = an ethylene-acrylic acid copolymer available from DuPont containing partial zinc neutralization of acid groups and containing antiblock and slip additives.
[4] = an ethylene-vinyl acetate copolymer containing grafted anhydride groups and available from Chemplex Co.
[5] = Inseparable The above table shows that as the amine end group concentration is increased over the level of 1.5 times the concentration of acid groups, the adhesion between polycaprolactam and alkylene copolymer is increased.

EXAMPLE 6

Two three layered laminates of 80 wt. % low density polyethylene (LDPE)/10 wt. % Surlyn 1652 SB/10 wt. % polyepsiloncaprolactam were prepared by tri-extrusion with the Surlyn at 490° F. melt and the polyepsiloncaprolactam at 520° F. melt. Peel strength measurements were made as in Examples 1 and 2 above and the results are set forth in Table II below.

TABLE II

| Example | Layer A amine/acid | Intermediate Layer | Layer B | Peel Strength, lbs/1" wide strip |
|---|---|---|---|---|
| C-C | 1.0 | Surlyn 1652 SB[1] | LDPE | 0.60 |
| 6 | 4.7 | Surlyn 1652 SB | LDPE | 1.65 |

[1] = Surlyn 1652 SB = ethylene-acrylic acid copolymer available from DuPont containing 50% partial zinc neutralization of acid groups and containing antiblock and slip additives.

Again as in Table I, the polyepsiloncaprolactam layer containing a higher concentration of amine end groups gave substantially better adhesion to the alkylene copolymer layer.

EXAMPLES 7 and 8

Three two layered laminates were prepared by coextrusion containing the layers and properties as set forth in Table III below. Peel strength measurements were again taken according to the aforementioned procedure immediately after preparation of the laminates (without immersion in water) and again after 3 weeks aging in a 50% relative humidity environment at 25° C.

TABLE III

| Example | Layer A amine/acid | Layer B | Peel Strength lbs/1" wide strip Fresh | 3 weeks |
|---|---|---|---|---|
| C-D | 1.0 | Surlyn 1650 SB | 2.45 | 0.15 |
| 7 | 4.7[1] | Surlyn 1650 SB | 3.45 | 3.45 |
| 8 | 4.7[2] | Surlyn 1650 SB | 3.50 | 3.15 |

[1] = at 460° F. melt.
[2] = at 450° F. melt.

The above table shows that, not only does a polyepsiloncaprolactam containing an excess of amine end groups initially provide superior adhesion to an alkylene copolymer, but also, upon aging, the adhesion remained substantially the same while the polyepsiloncaprolactam containing a lesser amount of amine end groups had practically no adhesion to the alkylene copolymer after 3 weeks' time.

EXAMPLES 9 and 10

Several two layered laminates comprised of one layer of polyamide and the other of a condensation polymer were prepared according to the procedure set forth in Examples 1 and 2 herein. Peel strengths were measured and the results are shown in Table IV below.

TABLE IV

| Example | Layer A amine/acid | Layer B | Peel Strength lbs/1" wide strip |
|---|---|---|---|
| C-E | 1.0 | PET[1] | 0.50 |
| C-F | 1.0 | PC | 2.25 |
| 9 | 4.7 | PET | 1.10 |
| 10 | 4.7 | PC[2] | I.S. |

[1] = polyethyleneterephthalate
[2] = polycarbonate of bisphenol-A.

It can be seen from Table IV that the peel strengths of high amine-containing nylon 6 laminates with both PET and polycarbonate are substantially greater than those with a nylon 6 containing lesser amounts of amine groups.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

What is claimed is:

1. A laminate structure comprised of:
   (a) at least one layer of a polyamide having about 60 to 97 mol percent of its end groups as amine end groups; and
   (b) at least one layer of an interpolymer comprised of units derived from ethylene and a comonomer selected from the group consisting of acrylic acid, methacrylic acid, and maleic anhydride, and
   wherein at least one polyamide layer is contiguous to at least one interpolymer layer.

2. The laminate structure of claim 1 wherein the polyamide is polyepsiloncaprolactam or an interpolymer thereof.

3. The laminate structure of claim 1 wherein the interpolymer is a metal salt of an ethylene acrylic acid copolymer or an ethylene methacrylic acid copolymer and wherein the metal is selected from the group consisting of $Na^+$, $K^+$, and $Zn^{++}$.

4. The laminate structure of claim 1 wherein the interpolymer contains acid anhydride.

5. A laminate structure comprised of:
   (a) at least one layer of a polyamide containing amine and acid terminal groups, wherein at least 1.5 times as many amine end groups than acid groups are present; and
   (b) at least one layer of an alkylenic interpolymer containing functional groups selected from the group consisting of acid groups, metal salts of said acids wherein the metal is selected from Groups I, II, III, IV-A and VII of the Periodic Table of the Elements, acid anhydrides, or mixtures thereof; and
   wherein at least one polyamide layer is bonded to at least one alkylenic interpolymer layer.

6. The laminate structure of claim 5 wherein more than 3 times as many amine end groups are present than acid end groups.

7. The laminate structure of claim 6 wherein the polyamide is polyepsiloncaprolactam or interpolymer thereof.

8. The laminate structure of claim 5 wherein the polyamide is comprised of units derived from hexamethylene diamine and adipic acid.

9. The laminate structure of claim 5 wherein the alkylenic interpolymer is a copolymer comprised of (a) at least 50 mol % of units derived from an ethylenically unsaturated monomer represented by the formula

where R can be independently hydrogen, or a substituted or unsubstituted alkyl or aryl radical of up to 8 carbon atoms, and (b) up to 50 mol % of units derived from a $C_3$ to $C_9$ carboxylic acid-containing monomer represented by the formula

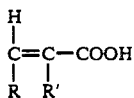

where R' is hydrogen or a $C_1$ to $C_6$ alkyl group, and R is hydrogen or fluorine.

10. The laminate structure of claim 9 wherein the ethylenically unsaturated monomer is selected from the group consisting of ethylene, propylene and styrene.

11. The laminate structure of claim 9 wherein the carboxylic acid-containing monomer is selected from the group consisting of acrylic acid, methacrylic acid, maleic acid, 2-ethylacrylic acid, crotonic acid, and 2-butylacrylic acid.

12. The laminate structure of claim 11 wherein the carboxylic acid is acrylic acid or methacrylic acid.

13. The laminate structure of claim 5 wherein the alkylenic interpolymer contains acid anhydride.

14. The laminate structure of claim 5 wherein the metal is selected from the group consisting of $Na^+$, $K^+$, and $Zn^+$.

15. The laminated structure of claim 14 wherein the metal is $Zn^{++}$.

16. A laminate structure comprised of:
(a) at least one layer of a polyamide containing amine and acid terminal groups, wherein at least 1.5 times as many amine end groups than acid end groups are present; and
(b) at least one layer of a graft polymer comprised of an alkylenic interpolymer having olefinic acid anhydride grafted thereto,
wherein at least one polyamide layer is contiguous to at least one graft polymer layer.

17. The laminate structure of claim 16 wherein the polyamide is polyepsiloncaprolactam.

18. The laminate structure of claim 16 wherein the polyamide is comprised of units derived from hexamethylene diamine and adipic acid.

19. The laminate structure of claim 16 wherein the alkylenic interpolymer is selected from the group consisting of polyethylene, polypropylene and polyethylene-diene copolymers.

20. The laminate structure of claim 16 wherein the alkylenic interpolymer is an ethylene-vinyl acetate copolymer.

21. A laminate structure comprised of:
(a) at least one layer of a polyamide containing amine and acid terminal groups, wherein at least 1.5 times as many amine end groups than acid end groups are present; and
(b) at least one layer comprised of one or more condensation polymers other than polyamide and containing pendant functional groups selected from the group consisting of acid groups, metal salts of said acids wherein the metal is selected from Groups I, II, III, IV-A and VII of the Periodic Table of the Elements, acid anhydrides, or mixtures thereof; and
wherein at least one polyamide layer is contiguous to at least one condensation polymer layer.

22. The laminate structure of claim 21 wherein the polyamide is polyepsiloncaprolactam or an interpolymer thereof.

23. The laminate structure of claim 21 wherein the polyamide is comprised of units derived from hexamethylene diamine and adipic acid.

24. The laminate structure of claim 21 wherein the condensation polymer contains acid groups partially neutralized with a metal selected from the group consisting of $Na^+$, $K^+$, and $Zn^{++}$.

25. The laminate structure of claim 21 wherein the condensation polymer is selected from the group consisting of polyesters and polycarbonates.

26. The laminate structure of claim 25 wherein the polyester is polyethyleneterephthalate or polybutyleneterephthalate.

27. The laminate structure of claim 25 wherein the polycarbonate is a polycarbonate of bisphenol A.

28. A laminate structure comprised of:
(a) at least one layer of a polyamide containing amine and acid terminal groups, wherein at least 1.5 times as many amine end groups than acid end groups are present; and
(b) at least one layer comprised of polyethyleneterephthalate or a polycarbonate of bisphenol A, wherein said polymers, have been melt blended to provide pendant functional groups selected from the group consisting of carboxylic acid and carbonate and
wherein at least one polyamide layer is contiguous to at least one polyethyleneterephthalate or polycarbonate layer.

29. The laminate structure of claim 28 wherein the polyamide is polyepsiloncaprolactam or interpolymers thereof.

30. A laminate structure comprised of:
(a) at least one layer comprised of at least 50 wt.%, based on the total weight of the layer, of a polyamide containing amine and acid terminal groups, wherein at least 1.5 times as many amine end groups than acid end groups are present, and
(b) at least one other layer comprised of one or more polymers wherein said layer contains an effective amount of pendant functional groups selected from the group consisting of acid groups, metal salts of said acids wherein the metal is selected from Groups I, II, III, IV-A and VII of the Periodic Table of the Elements, acid anhydrides, and mixtures thereof; and
wherein at least one polyamide containing layer is contiguous to at least one said other layer.

31. The laminate structure of claim 30 wherein the polyamide is polyepsiloncaprolactam or an interpolymer thereof.

32. The laminate structure of claim 30 wherein at least 75 wt.% polyamide is present.

33. The laminate structure of claim 30 wherein at least 50 wt.%, based on the total weight of said other layer, of alkylenic interpolymer containing an effective amount of acid groups is present in said other layer.

34. The laminate structure of claim 33 wherein the acid groups are partially neutralized with a metal selected from the group consisting of $Na^+$, $K^+$, and $Zn^{++}$.

35. The laminate structure of claim 30 wherein at least 50 wt.%, based on the total weight of said other layer, of a polymer selected from the group consisting of alkylenic interpolymers and condensation polymers containing said functional groups is present in said other layer.

* * * * *